United States Patent
Suzuki

(10) Patent No.: US 7,532,674 B2
(45) Date of Patent: May 12, 2009

(54) TRANSMITTING DEVICE, TRANSMITTING METHOD, AND STORAGE MEDIUM

(75) Inventor: Mitsuhiro Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 723 days.

(21) Appl. No.: 11/066,276

(22) Filed: Feb. 28, 2005

(65) Prior Publication Data

US 2005/0259759 A1    Nov. 24, 2005

Related U.S. Application Data

(63) Continuation of application No. PCT/JP2004/011622, filed on Aug. 12, 2004.

(30) Foreign Application Priority Data

Aug. 29, 2003 (JP) ............................. 2003-307264

(51) Int. Cl.
  *H04K 1/10* (2006.01)
(52) U.S. Cl. .................................................. 375/260
(58) Field of Classification Search ................ 375/260, 375/278, 284, 285, 296
  See application file for complete search history.

(56) References Cited

U.S. PATENT DOCUMENTS

| | | | |
|---|---|---|---|
| 5,687,243 A * | 11/1997 | McLaughlin et al. ....... | 381/94.3 |
| 6,553,004 B1 | 4/2003 | Pavy | |
| 7,327,793 B2 * | 2/2008 | Jin ............................. | 375/260 |
| 2005/0027514 A1 * | 2/2005 | Zhang et al. ................ | 704/205 |
| 2005/0180386 A1 * | 8/2005 | Hansen et al. .............. | 370/350 |
| 2006/0262880 A1 * | 11/2006 | Mizuta et al. ............... | 375/297 |

FOREIGN PATENT DOCUMENTS

JP    11-220452    8/1999

(Continued)

OTHER PUBLICATIONS

"Multi-band OFDM Physical Layer Proposal for IEEE 802.15 Task Group 3a", IEEE P802.15-03/268r2, 2003.07, <URL:http://grouper.ieee.org/groups/802/15/pub/2003/Jul03/03268r0P802-15_TG3a-Multi-band-CFP-Document.pdf>, Wireless Personal Area Networks, pp. 1 to 69, Nov. 2003. (revised version).

(Continued)

*Primary Examiner*—Chieh M Fan
*Assistant Examiner*—Jaison Joseph
(74) *Attorney, Agent, or Firm*—Oblon, Spivak, McClelland, Maier & Neustadt, P.C.

(57) ABSTRACT

Disclosed is a method that preferably performs transmission processing to a time sequence signal of a known pattern as the pre-amble and an OFDM transmitted signal.

In data communications, the general practice defines the pre-amble and detects the peaks of the mutual correlation to thereby detect synchronization. The pre-amble here is defined by the binary value in most cases for simplification of a correlation detecting device. In this case, the spectrum becomes irregular with sharp peaks and dips, which deteriorates the correlation characteristic. The method of the invention forcibly adjusts the spectrum amplitude of the pre-amble pattern on the transmitting side while retaining the phase information thereof, and thereby the method improves the spectrum and correlation characteristics while securing simplification of a correlation detecting device on the receiving side.

11 Claims, 16 Drawing Sheets

FOREIGN PATENT DOCUMENTS

JP      2001-339363     12/2001

OTHER PUBLICATIONS

Anuj Batra, et al., "Multi-band OFDM Physical Layer Proposal for IEEE 802.15 Task Group 3a", IEEE P802.15-03/268r0, 2003.07, <URL: http://grouper.ieee.org/groups/802/15/pub/2003/Jul03/03268r0P802-15_TG3a-Multi-band —CFP-Document.doc, Jul. 2003, pp. 1-71.

U.S. Appl. No. 10/528,473, filed Mar. 21, 2005, Suzuki.

U.S. Appl. No. 11/066,276, filed Feb. 28, 2005, Suzuki.

* cited by examiner

F I G. 4
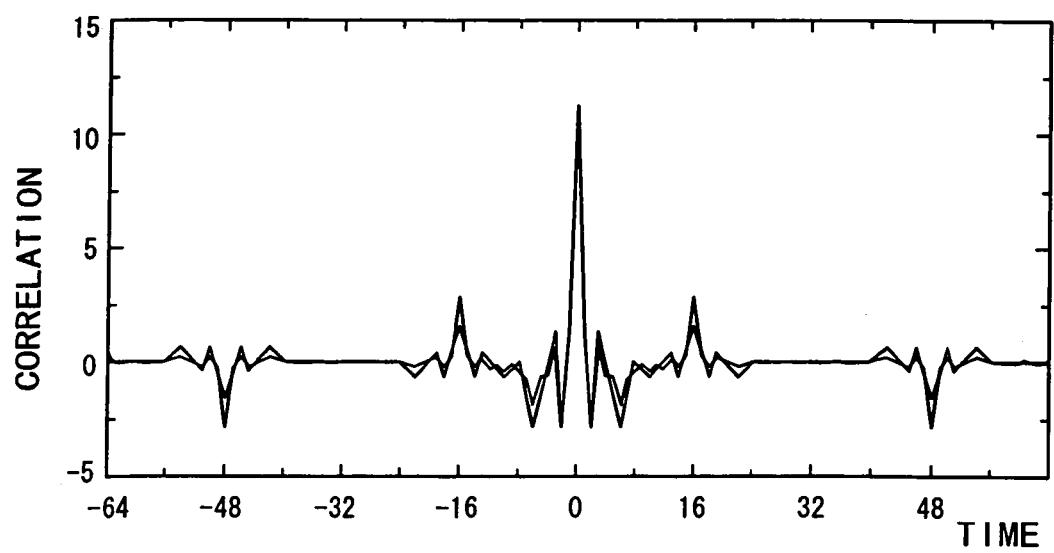

F I G. 5
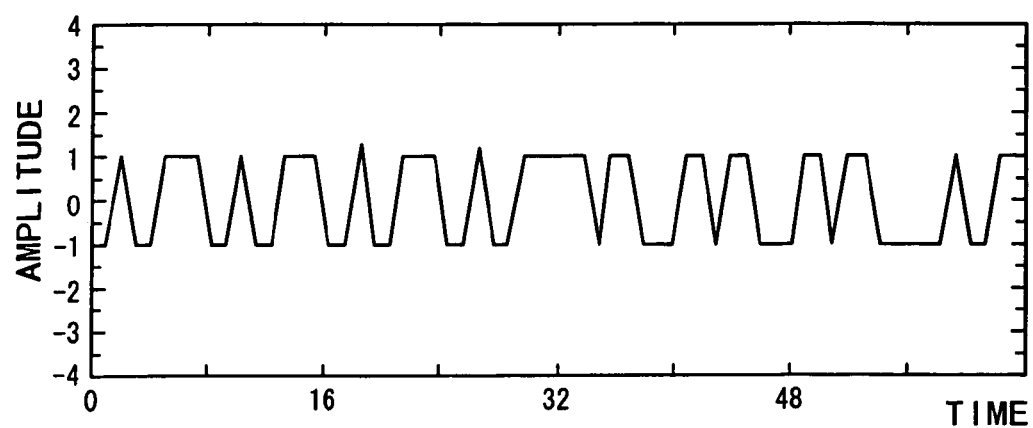

F I G. 7
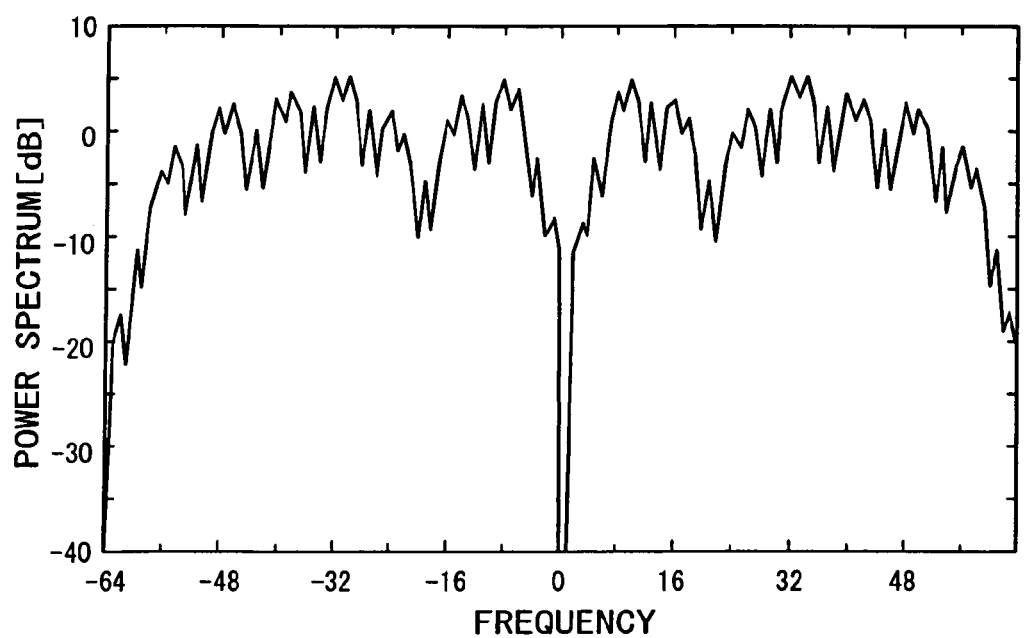

F I G. 1 0
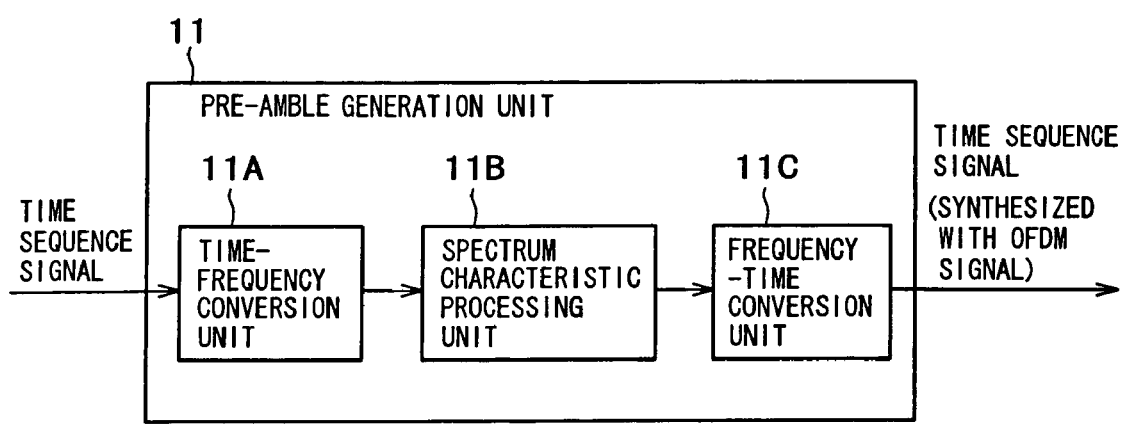

FIG. 12

| Sequence Element | Value | Sequence Element | Value | Sequence Element | Value | Sequence Element | Value |
|---|---|---|---|---|---|---|---|
| $C_0$ | 0.6564 | $C_{32}$ | -0.0844 | $C_{64}$ | -0.2095 | $C_{96}$ | 0.4232 |
| $C_1$ | -1.3671 | $C_{33}$ | 1.1974 | $C_{65}$ | 1.1640 | $C_{97}$ | -1.2684 |
| $C_2$ | -0.9958 | $C_{34}$ | 1.2261 | $C_{66}$ | 1.2334 | $C_{98}$ | -1.8151 |
| $C_3$ | -1.3981 | $C_{35}$ | 1.4401 | $C_{67}$ | 1.5338 | $C_{99}$ | -1.4829 |
| $C_4$ | 0.8481 | $C_{36}$ | -0.5988 | $C_{68}$ | -0.8844 | $C_{100}$ | 1.0302 |
| $C_5$ | 1.0892 | $C_{37}$ | -0.4675 | $C_{69}$ | -0.3857 | $C_{101}$ | 0.9419 |
| $C_6$ | -0.8621 | $C_{38}$ | 0.8520 | $C_{70}$ | 0.7730 | $C_{102}$ | -1.1472 |
| $C_7$ | 1.1512 | $C_{39}$ | -0.8922 | $C_{71}$ | -0.9754 | $C_{103}$ | 1.4858 |
| $C_8$ | 0.9602 | $C_{40}$ | -0.5603 | $C_{72}$ | -0.2315 | $C_{104}$ | -0.6794 |
| $C_9$ | -1.3581 | $C_{41}$ | 1.1886 | $C_{73}$ | 0.5579 | $C_{105}$ | 0.9573 |
| $C_{10}$ | -0.8354 | $C_{42}$ | 1.1128 | $C_{74}$ | 0.4035 | $C_{106}$ | 1.0807 |
| $C_{11}$ | -1.3249 | $C_{43}$ | 1.08833 | $C_{75}$ | 0.4248 | $C_{107}$ | 1.1445 |
| $C_{12}$ | 1.0964 | $C_{44}$ | -0.9073 | $C_{76}$ | -0.3359 | $C_{108}$ | -1.2312 |
| $C_{13}$ | 1.3334 | $C_{45}$ | -1.6227 | $C_{77}$ | -0.9914 | $C_{109}$ | -0.6643 |
| $C_{14}$ | -0.7378 | $C_{46}$ | 1.0013 | $C_{78}$ | 0.5975 | $C_{110}$ | 0.3836 |
| $C_{15}$ | 1.3565 | $C_{47}$ | -1.6067 | $C_{79}$ | -0.8408 | $C_{111}$ | -1.1482 |
| $C_{16}$ | 0.9361 | $C_{48}$ | 0.3360 | $C_{80}$ | 0.3587 | $C_{112}$ | -0.0353 |
| $C_{17}$ | -0.8212 | $C_{49}$ | -1.3136 | $C_{81}$ | -0.9604 | $C_{113}$ | -0.6747 |
| $C_{18}$ | -0.2662 | $C_{50}$ | -1.4447 | $C_{82}$ | -1.0002 | $C_{114}$ | -1.1653 |
| $C_{19}$ | -0.6866 | $C_{51}$ | -1.7238 | $C_{83}$ | -1.1636 | $C_{115}$ | -0.8896 |
| $C_{20}$ | 0.8437 | $C_{52}$ | 1.0287 | $C_{84}$ | 0.9590 | $C_{116}$ | 0.2414 |
| $C_{21}$ | 1.1237 | $C_{53}$ | 0.6100 | $C_{85}$ | 0.7137 | $C_{117}$ | 0.1160 |
| $C_{22}$ | -0.3265 | $C_{54}$ | -0.9237 | $C_{86}$ | -0.6776 | $C_{118}$ | -0.6987 |
| $C_{23}$ | 1.0511 | $C_{55}$ | 1.2618 | $C_{87}$ | 0.9824 | $C_{119}$ | 0.4781 |
| $C_{24}$ | 0.7927 | $C_{56}$ | 0.5974 | $C_{88}$ | -0.5454 | $C_{120}$ | 0.1821 |
| $C_{25}$ | -0.3363 | $C_{57}$ | -1.0976 | $C_{89}$ | 1.1022 | $C_{121}$ | -1.0672 |
| $C_{26}$ | -0.1342 | $C_{58}$ | -0.9776 | $C_{90}$ | 1.6485 | $C_{122}$ | -0.9676 |
| $C_{27}$ | -0.1546 | $C_{59}$ | -0.9982 | $C_{91}$ | 1.3307 | $C_{123}$ | -1.2321 |
| $C_{28}$ | 0.6955 | $C_{60}$ | 0.8967 | $C_{92}$ | -1.2852 | $C_{124}$ | 0.5003 |
| $C_{29}$ | 1.0608 | $C_{61}$ | 1.7640 | $C_{93}$ | -1.2659 | $C_{125}$ | 0.7419 |
| $C_{30}$ | -0.1600 | $C_{62}$ | -1.0211 | $C_{94}$ | 0.9435 | $C_{126}$ | -0.8934 |
| $C_{31}$ | 0.9442 | $C_{63}$ | 1.6913 | $C_{95}$ | -1.6809 | $C_{127}$ | 0.8391 |

FIG. 13

| Sequence Element | Value | Sequence Element | Value | Sequence Element | Value | Sequence Element | Value |
|---|---|---|---|---|---|---|---|
| $C_0$ | 0.9679 | $C_{32}$ | -1.2905 | $C_{64}$ | 1.5280 | $C_{96}$ | 0.5193 |
| $C_1$ | -1.0186 | $C_{33}$ | 1.1040 | $C_{65}$ | -0.9193 | $C_{97}$ | -0.3439 |
| $C_2$ | 0.4883 | $C_{34}$ | -1.2408 | $C_{66}$ | 1.1246 | $C_{98}$ | 0.1428 |
| $C_3$ | 0.5432 | $C_{35}$ | -0.8062 | $C_{67}$ | 1.2622 | $C_{99}$ | 0.6251 |
| $C_4$ | -1.4702 | $C_{36}$ | 1.5425 | $C_{68}$ | -1.4406 | $C_{100}$ | -1.0468 |
| $C_5$ | -1.4507 | $C_{37}$ | 1.0955 | $C_{69}$ | -1.4929 | $C_{101}$ | -0.5798 |
| $C_6$ | -1.1752 | $C_{38}$ | 1.4284 | $C_{70}$ | -1.1508 | $C_{102}$ | -0.8237 |
| $C_7$ | -0.0730 | $C_{39}$ | -0.4593 | $C_{71}$ | 0.4126 | $C_{103}$ | 0.2667 |
| $C_8$ | -1.2445 | $C_{40}$ | -1.0408 | $C_{72}$ | -1.0462 | $C_{104}$ | -0.9564 |
| $C_9$ | 0.3143 | $C_{41}$ | 1.0542 | $C_{73}$ | 0.7232 | $C_{105}$ | 0.6016 |
| $C_{10}$ | -1.3951 | $C_{42}$ | -0.4446 | $C_{74}$ | -1.1574 | $C_{106}$ | -0.9964 |
| $C_{11}$ | -0.9694 | $C_{43}$ | -0.7929 | $C_{75}$ | -0.7102 | $C_{107}$ | -0.3541 |
| $C_{12}$ | 0.4563 | $C_{44}$ | 1.6733 | $C_{76}$ | 0.8502 | $C_{108}$ | 0.3965 |
| $C_{13}$ | 0.3073 | $C_{45}$ | 1.7598 | $C_{77}$ | 0.6260 | $C_{109}$ | 0.5201 |
| $C_{14}$ | 0.6408 | $C_{46}$ | 1.3273 | $C_{78}$ | 0.9530 | $C_{110}$ | 0.4733 |
| $C_{15}$ | -0.9798 | $C_{47}$ | -0.2465 | $C_{79}$ | -0.4971 | $C_{111}$ | -0.2362 |
| $C_{16}$ | -1.4116 | $C_{48}$ | 1.6850 | $C_{80}$ | -0.8633 | $C_{112}$ | -0.6892 |
| $C_{17}$ | 0.6038 | $C_{49}$ | -0.7091 | $C_{81}$ | 0.6910 | $C_{113}$ | 0.4787 |
| $C_{18}$ | -1.3860 | $C_{50}$ | 1.1396 | $C_{82}$ | -0.3639 | $C_{114}$ | -0.2605 |
| $C_{19}$ | -1.0888 | $C_{51}$ | 1.5114 | $C_{83}$ | -0.8874 | $C_{115}$ | -0.5887 |
| $C_{20}$ | 1.1036 | $C_{52}$ | -1.4343 | $C_{84}$ | 1.5311 | $C_{116}$ | 0.9411 |
| $C_{21}$ | 0.7067 | $C_{53}$ | -1.5005 | $C_{85}$ | 1.1546 | $C_{117}$ | 0.7364 |
| $C_{22}$ | 1.1667 | $C_{54}$ | -1.2572 | $C_{86}$ | 1.1935 | $C_{118}$ | 0.6714 |
| $C_{23}$ | -1.0225 | $C_{55}$ | 0.8274 | $C_{87}$ | -0.2930 | $C_{119}$ | -0.1746 |
| $C_{24}$ | -1.2471 | $C_{56}$ | -1.5140 | $C_{88}$ | 1.3285 | $C_{120}$ | 1.1776 |
| $C_{25}$ | 0.7788 | $C_{57}$ | 1.1421 | $C_{89}$ | -0.7231 | $C_{121}$ | -0.8803 |
| $C_{26}$ | -1.2716 | $C_{58}$ | -1.0135 | $C_{90}$ | 1.2832 | $C_{122}$ | 1.2542 |
| $C_{27}$ | -0.8745 | $C_{59}$ | -1.0657 | $C_{91}$ | 0.7878 | $C_{123}$ | 0.5111 |
| $C_{28}$ | 1.2175 | $C_{60}$ | 1.4073 | $C_{92}$ | -0.8095 | $C_{124}$ | -0.8209 |
| $C_{29}$ | 0.8419 | $C_{61}$ | 1.8196 | $C_{93}$ | -0.7463 | $C_{125}$ | -0.8975 |
| $C_{30}$ | 1.2881 | $C_{62}$ | 1.1679 | $C_{94}$ | -0.8973 | $C_{126}$ | -0.9091 |
| $C_{31}$ | -0.8210 | $C_{63}$ | -0.4131 | $C_{95}$ | 0.5560 | $C_{127}$ | 0.2562 |

FIG. 14

| Sequence Element | Value | Sequence Element | Value | Sequence Element | Value | Sequence Element | Value |
|---|---|---|---|---|---|---|---|
| $C_0$ | 0.4047 | $C_{32}$ | -0.9671 | $C_{64}$ | -0.7298 | $C_{96}$ | 0.2424 |
| $C_1$ | 0.5799 | $C_{33}$ | -0.9819 | $C_{65}$ | -0.9662 | $C_{97}$ | 0.5703 |
| $C_2$ | -0.3407 | $C_{34}$ | 0.7980 | $C_{66}$ | 0.9694 | $C_{98}$ | -0.6381 |
| $C_3$ | 0.4343 | $C_{35}$ | -0.8158 | $C_{67}$ | -0.8053 | $C_{99}$ | 0.7861 |
| $C_4$ | 0.0973 | $C_{36}$ | -0.9188 | $C_{68}$ | -0.9052 | $C_{100}$ | 0.9175 |
| $C_5$ | -0.7637 | $C_{37}$ | 1.5146 | $C_{69}$ | 1.5933 | $C_{101}$ | -0.4595 |
| $C_6$ | -0.6181 | $C_{38}$ | 0.8138 | $C_{70}$ | 0.8418 | $C_{102}$ | -0.2201 |
| $C_7$ | -0.6539 | $C_{39}$ | 1.3773 | $C_{71}$ | 1.5363 | $C_{103}$ | -0.7755 |
| $C_8$ | 0.3768 | $C_{40}$ | 0.2108 | $C_{72}$ | 0.3085 | $C_{104}$ | -0.2965 |
| $C_9$ | 0.7241 | $C_{41}$ | 0.9245 | $C_{73}$ | 1.3016 | $C_{105}$ | -1.1220 |
| $C_{10}$ | -1.2095 | $C_{42}$ | -1.2138 | $C_{74}$ | -1.5546 | $C_{106}$ | 1.7152 |
| $C_{11}$ | 0.6027 | $C_{43}$ | 1.1252 | $C_{75}$ | 1.5347 | $C_{107}$ | -1.2756 |
| $C_{12}$ | 0.4587 | $C_{44}$ | 0.9663 | $C_{76}$ | 1.0935 | $C_{108}$ | -0.7731 |
| $C_{13}$ | -1.3879 | $C_{45}$ | -0.8418 | $C_{77}$ | -0.8978 | $C_{109}$ | 1.0724 |
| $C_{14}$ | -1.0592 | $C_{46}$ | -0.6811 | $C_{78}$ | -0.9712 | $C_{110}$ | 1.1733 |
| $C_{15}$ | -1.4052 | $C_{47}$ | -1.3003 | $C_{79}$ | -1.3763 | $C_{111}$ | 1.4711 |
| $C_{16}$ | -0.8439 | $C_{48}$ | -0.3397 | $C_{80}$ | -0.6360 | $C_{112}$ | 0.4881 |
| $C_{17}$ | -1.5992 | $C_{49}$ | -1.1051 | $C_{81}$ | -1.2947 | $C_{113}$ | 0.7528 |
| $C_{18}$ | 1.1975 | $C_{50}$ | 1.2400 | $C_{82}$ | 1.6436 | $C_{114}$ | -0.6417 |
| $C_{19}$ | -1.9525 | $C_{51}$ | -1.3975 | $C_{83}$ | -1.6564 | $C_{115}$ | 0.7528 |
| $C_{20}$ | -1.5141 | $C_{52}$ | -0.7467 | $C_{84}$ | -1.1981 | $C_{116}$ | 0.8002 |
| $C_{21}$ | 0.7219 | $C_{53}$ | 0.2706 | $C_{85}$ | 0.8719 | $C_{117}$ | -0.0077 |
| $C_{22}$ | 0.6982 | $C_{54}$ | 0.7294 | $C_{86}$ | 0.9992 | $C_{118}$ | -0.2336 |
| $C_{23}$ | 1.2924 | $C_{55}$ | 0.7444 | $C_{87}$ | 1.4872 | $C_{119}$ | -0.4653 |
| $C_{24}$ | -0.9460 | $C_{56}$ | -0.3970 | $C_{88}$ | -0.4586 | $C_{120}$ | 0.6862 |
| $C_{25}$ | -1.2407 | $C_{57}$ | -1.0718 | $C_{89}$ | -0.8404 | $C_{121}$ | 1.2716 |
| $C_{26}$ | 0.4572 | $C_{58}$ | 0.6646 | $C_{90}$ | 0.6982 | $C_{122}$ | -0.8880 |
| $C_{27}$ | -1.2151 | $C_{59}$ | -1.1037 | $C_{91}$ | -0.7959 | $C_{123}$ | 1.4011 |
| $C_{28}$ | -0.9869 | $C_{60}$ | -0.5716 | $C_{92}$ | -0.5692 | $C_{124}$ | 0.9531 |
| $C_{29}$ | 1.2792 | $C_{61}$ | 0.9001 | $C_{93}$ | 1.3528 | $C_{125}$ | -1.1210 |
| $C_{30}$ | 0.6882 | $C_{62}$ | 0.7317 | $C_{94}$ | 0.9536 | $C_{126}$ | -0.9489 |
| $C_{31}$ | 1.2586 | $C_{63}$ | 0.9846 | $C_{95}$ | 1.1784 | $C_{127}$ | -1.2566 |

FIG. 15

| Sequence Element | Value | Sequence Element | Value | Sequence Element | Value | Sequence Element | Value |
|---|---|---|---|---|---|---|---|
| $C_0$ | 1.1549 | $C_{32}$ | -1.2385 | $C_{64}$ | 1.3095 | $C_{96}$ | -1.0094 |
| $C_1$ | 1.0079 | $C_{33}$ | -0.7883 | $C_{65}$ | 0.6675 | $C_{97}$ | -0.759 |
| $C_2$ | 0.7356 | $C_{34}$ | -0.7954 | $C_{66}$ | 1.2587 | $C_{98}$ | -1.0786 |
| $C_3$ | -0.7434 | $C_{35}$ | 1.0874 | $C_{67}$ | -0.9993 | $C_{99}$ | 0.6699 |
| $C_4$ | -1.3930 | $C_{36}$ | 1.1491 | $C_{68}$ | -1.0052 | $C_{100}$ | 0.9813 |
| $C_5$ | 1.2818 | $C_{37}$ | -1.4780 | $C_{69}$ | 0.6601 | $C_{101}$ | -0.5563 |
| $C_6$ | -1.1033 | $C_{38}$ | 0.8870 | $C_{70}$ | -1.0228 | $C_{102}$ | 1.0548 |
| $C_7$ | -0.2532 | $C_{39}$ | 0.4694 | $C_{71}$ | -0.7489 | $C_{103}$ | 0.8925 |
| $C_8$ | -0.7905 | $C_{40}$ | 1.0566 | $C_{72}$ | 0.5086 | $C_{104}$ | -1.3656 |
| $C_9$ | -0.4261 | $C_{41}$ | 1.1266 | $C_{73}$ | 0.1563 | $C_{105}$ | -0.8472 |
| $C_{10}$ | -0.9390 | $C_{42}$ | 0.9935 | $C_{74}$ | 0.0673 | $C_{106}$ | -1.3110 |
| $C_{11}$ | 0.4345 | $C_{43}$ | -1.2462 | $C_{75}$ | -0.8375 | $C_{107}$ | 1.1897 |
| $C_{12}$ | 0.4433 | $C_{44}$ | -1.7869 | $C_{76}$ | -1.0746 | $C_{108}$ | 1.5127 |
| $C_{13}$ | -0.3076 | $C_{45}$ | 1.7462 | $C_{77}$ | 0.4454 | $C_{109}$ | -0.7474 |
| $C_{14}$ | 0.5644 | $C_{46}$ | -1.4881 | $C_{78}$ | -0.7831 | $C_{110}$ | 1.4678 |
| $C_{15}$ | 0.2571 | $C_{47}$ | -0.4090 | $C_{79}$ | -0.3623 | $C_{111}$ | 1.0295 |
| $C_{16}$ | -1.0030 | $C_{48}$ | -1.4694 | $C_{80}$ | -1.3658 | $C_{112}$ | -0.9210 |
| $C_{17}$ | -0.7820 | $C_{49}$ | -0.7923 | $C_{81}$ | -1.0854 | $C_{113}$ | -0.4784 |
| $C_{18}$ | -0.4064 | $C_{50}$ | -1.4607 | $C_{82}$ | -1.4923 | $C_{114}$ | -0.5022 |
| $C_{19}$ | 0.9035 | $C_{51}$ | 0.9113 | $C_{83}$ | 0.4233 | $C_{115}$ | 1.2153 |
| $C_{20}$ | 1.5406 | $C_{52}$ | 0.8454 | $C_{84}$ | 0.6741 | $C_{116}$ | 1.5783 |
| $C_{21}$ | -1.4613 | $C_{53}$ | -0.8866 | $C_{85}$ | -1.0157 | $C_{117}$ | -0.7718 |
| $C_{22}$ | 1.2745 | $C_{54}$ | 0.8852 | $C_{86}$ | 0.8304 | $C_{118}$ | 1.2384 |
| $C_{23}$ | 0.3715 | $C_{55}$ | 0.4918 | $C_{87}$ | 0.4878 | $C_{119}$ | 0.6695 |
| $C_{24}$ | 1.8134 | $C_{56}$ | -0.6096 | $C_{88}$ | 0.8304 | $C_{120}$ | 0.8821 |
| $C_{25}$ | 0.9438 | $C_{57}$ | -0.4322 | $C_{89}$ | -1.1884 | $C_{121}$ | 0.7808 |
| $C_{26}$ | 1.3130 | $C_{58}$ | -0.1327 | $C_{90}$ | -1.4008 | $C_{122}$ | 1.0537 |
| $C_{27}$ | -1.3070 | $C_{59}$ | 0.4953 | $C_{91}$ | 0.7795 | $C_{123}$ | -0.0791 |
| $C_{28}$ | -1.3462 | $C_{60}$ | 0.9702 | $C_{92}$ | 1.2926 | $C_{124}$ | -0.2845 |
| $C_{29}$ | 1.6868 | $C_{61}$ | -0.8667 | $C_{93}$ | -1.2049 | $C_{125}$ | 0.5790 |
| $C_{30}$ | -1.2153 | $C_{62}$ | 0.6803 | $C_{94}$ | 1.2934 | $C_{126}$ | -0.4664 |
| $C_{31}$ | -0.6778 | $C_{63}$ | -0.0244 | $C_{95}$ | 0.8123 | $C_{127}$ | -0.1097 |

FIG. 16

| Sequence Element | Value | Sequence Element | Value | Sequence Element | Value | Sequence Element | Value |
|---|---|---|---|---|---|---|---|
| $C_0$ | 0.9574 | $C_{32}$ | 0.8400 | $C_{64}$ | 0.5859 | $C_{96}$ | -0.8528 |
| $C_1$ | 0.5270 | $C_{33}$ | 1.3980 | $C_{65}$ | 0.3053 | $C_{97}$ | -0.6973 |
| $C_2$ | 1.5929 | $C_{34}$ | 1.1147 | $C_{66}$ | 0.8948 | $C_{98}$ | -1.2477 |
| $C_3$ | -0.2500 | $C_{35}$ | -0.4732 | $C_{67}$ | -0.6744 | $C_{99}$ | 0.6246 |
| $C_4$ | -0.2536 | $C_{36}$ | -1.7178 | $C_{68}$ | -0.8901 | $C_{100}$ | 0.7687 |
| $C_5$ | -0.3023 | $C_{37}$ | -0.8477 | $C_{69}$ | 0.8133 | $C_{101}$ | 0.7987 |
| $C_6$ | 1.2907 | $C_{38}$ | 1.5083 | $C_{70}$ | 0.9201 | $C_{102}$ | -1.2809 |
| $C_7$ | -0.4258 | $C_{39}$ | -1.4364 | $C_{71}$ | -1.0841 | $C_{103}$ | 1.1023 |
| $C_8$ | 1.0012 | $C_{40}$ | 0.3853 | $C_{72}$ | -0.8036 | $C_{104}$ | 0.4250 |
| $C_9$ | 1.7704 | $C_{41}$ | 1.5673 | $C_{73}$ | -0.3105 | $C_{105}$ | -0.1614 |
| $C_{10}$ | 0.8593 | $C_{42}$ | 0.0295 | $C_{74}$ | -1.0514 | $C_{106}$ | 0.7547 |
| $C_{11}$ | -0.3719 | $C_{43}$ | -0.4204 | $C_{75}$ | 0.7644 | $C_{107}$ | -0.6696 |
| $C_{12}$ | -1.3465 | $C_{44}$ | -1.4856 | $C_{76}$ | 0.7301 | $C_{108}$ | -0.3920 |
| $C_{13}$ | -0.7419 | $C_{45}$ | -0.8404 | $C_{77}$ | 0.9788 | $C_{109}$ | -0.7589 |
| $C_{14}$ | 1.5350 | $C_{46}$ | 1.0111 | $C_{78}$ | -1.1305 | $C_{110}$ | 0.6701 |
| $C_{15}$ | -1.2800 | $C_{47}$ | -1.4269 | $C_{79}$ | 1.3257 | $C_{111}$ | -0.9381 |
| $C_{16}$ | 0.6955 | $C_{48}$ | 0.3033 | $C_{80}$ | 0.7801 | $C_{112}$ | -0.7483 |
| $C_{17}$ | 1.7204 | $C_{49}$ | 0.7757 | $C_{81}$ | 0.7867 | $C_{113}$ | -0.9659 |
| $C_{18}$ | 0.1643 | $C_{50}$ | -0.1370 | $C_{82}$ | 1.0996 | $C_{114}$ | -0.9192 |
| $C_{19}$ | -0.3347 | $C_{51}$ | -0.5250 | $C_{83}$ | -0.5623 | $C_{115}$ | 0.3925 |
| $C_{20}$ | -1.7244 | $C_{52}$ | -1.1589 | $C_{84}$ | -1.2227 | $C_{116}$ | 1.2864 |
| $C_{21}$ | -0.7447 | $C_{53}$ | -0.8324 | $C_{85}$ | -0.8223 | $C_{117}$ | 0.6784 |
| $C_{22}$ | 1.1141 | $C_{54}$ | 0.6336 | $C_{86}$ | 1.2074 | $C_{118}$ | -1.0909 |
| $C_{23}$ | -1.3541 | $C_{55}$ | -1.2698 | $C_{87}$ | -1.2338 | $C_{119}$ | 1.1140 |
| $C_{24}$ | -0.7293 | $C_{56}$ | -0.7853 | $C_{88}$ | 0.2957 | $C_{120}$ | -0.6134 |
| $C_{25}$ | 0.2682 | $C_{57}$ | -0.7031 | $C_{89}$ | 1.0999 | $C_{121}$ | -1.5467 |
| $C_{26}$ | -1.2401 | $C_{58}$ | -1.1106 | $C_{90}$ | -0.0201 | $C_{122}$ | -0.3031 |
| $C_{27}$ | 1.0527 | $C_{59}$ | 0.6071 | $C_{91}$ | -0.5860 | $C_{123}$ | 0.9457 |
| $C_{28}$ | 0.1199 | $C_{60}$ | 0.7164 | $C_{92}$ | -1.2284 | $C_{124}$ | 1.9645 |
| $C_{29}$ | 1.1496 | $C_{61}$ | 0.8305 | $C_{93}$ | -0.9215 | $C_{125}$ | 1.4549 |
| $C_{30}$ | -1.0544 | $C_{62}$ | -1.2355 | $C_{94}$ | 0.7941 | $C_{126}$ | -1.2760 |
| $C_{31}$ | 1.3176 | $C_{63}$ | 1.1754 | $C_{95}$ | -1.4128 | $C_{127}$ | 2.2102 |

TRANSMITTING DEVICE, TRANSMITTING METHOD, AND STORAGE MEDIUM

CROSS REFERENCE TO RELATED APPLICATION

This is a Continuation Application of PCT Application No. PCT/JP04/011622, filed on Aug. 12, 2004. This application is based upon and claims the benefit of priority from the prior Japanese Patent Application No. 2003-307264, filed Aug. 29, 2003, the entire contents of which are incorporated herein by reference.

TECHNICAL FIELD

The present invention relates to a transmitting device, transmitting method, and storage medium that process radio transmitted signals. The invention specifically relates to a transmitting device, transmitting method, and storage medium that perform amplitude and phase modulation to carriers each, perform inverse FFT to the plural carriers to convert them into time base signals while maintaining the orthogonality of the carriers on the frequency axis, and perform transmission processing to a transmitted OFDM (Orthogonal Frequency Division Multiplexing) signal.

Further in detail, the invention relates to a transmitting device, transmitting method, and storage medium that perform transmission processing to a known pattern signal for attaining synchronization on the receiving side, specifically to a transmitting device, transmitting method, and storage medium that perform transmission processing to a known pattern signal made up with a time sequence together with an OFDM-modulated transmitted signal.

BACKGROUND ART

The wireless LAN has attracted considerable attention as a system that relieves users from the troublesome wiring of the wired LAN. The wireless LAN can eliminate most of wired cables in a workspace such as an office, which makes it possible to move personal computers and other communication terminals comparably easily. In recent years, accompanied with the enhanced speed and reduced price of the wireless LAN, the demand for it is remarkably increased. Especially recently, the personal area network (PAN) is under the examination for introduction, so that people can communicate information with a small-scale wireless network using multiple electronic devices surrounding people. As an example, different wireless communication systems and wireless communication devices are stipulated, which use the frequency bandwidths that do not require a license by the supervising agency, such as 2.4 GHz band and 5 GHz band.

Recently, a wireless communication system using an ultra wide bandwidth covering 3 GHz to 10 GHz, which is called the 'ultra wide band (UWB) communication' has drawn considerable attention as a wireless communication system that realizes a short-distance ultra-high speed transmission; and the practical development thereof is expected. At present, the data transmission system with a packet structure including the preamble is being designed as an access control system for the UWB communication in IEEE 820.15.3 and so forth.

Now, building up a wireless network in a room will make the multi-path environments, in which the receiving devices receive a direct wave having multiple reflected waves and delayed waves overlapped. The multi-path environments will cause delay distortion (or frequency selective fading), which effects errors on the communication. And, the inter-symbol interferences due to the delay distortion will be generated.

One of the main countermeasures for the delay distortion is the multi-carrier transmission system. Since the multi-carrier transmission system distributes transmitted data to plural carriers of different frequencies, the bandwidths of the carriers each become narrow, which makes it difficult to receive the influences of the frequency selective fading.

In the OFDM (Orthogonal Frequency Division Multiplexing) system being one of the multi-carrier transmission systems, the frequencies of the carriers each are set in a manner that the carriers each are mutually orthogonal in the symbol interval. During transmission of information, the system performs serial/parallel conversion to the information transmitted in serial at each symbol cycle that is slower than the data transmission rate, allocates the plural data converted into the serial/parallel format to the carriers each, performs the amplitude and phase modulation to the carriers each, performs inverse FFT to the plural carriers, and thereby converts the carriers on the frequency axis into the signals on the time base while retaining the orthogonality on the frequency axis to transmit the information. During reception, the system performs the operation reverse to the above; that is, it performs FFT to convert the signals on the time base into the signals on the frequency axis, performs the demodulations corresponding to the respective modulation systems to the carriers each, performs parallel/serial conversion to the demodulated signals, and reproduces the original information transmitted in the serial format.

The OFDM modulation system is adopted as the standard for the wireless LAN, for example, in IEEE 802.11a/g. Also in IEEE 802.15.3a, the standardization of the UWB communication system adopting the OFDM modulation system (hereunder, called 'OFDM_UWB') is in progress, in addition to the DS-UWB system with the diffusion speed of DS information signal raised to the limit, and the impulse-UWB system for transmitting and receiving the information signal that uses the impulse signal string having a very short cycle of about some 100 pico-seconds. In case of the OFDM_UWB communication system, the OFDM modulation is under examination, which performs frequency hopping (FH) on three sub-bands whose bandwidths are 528 MHz each in the frequency band covering 3.14 to 4.8 GHz, and uses IFFT/FFT having each frequency band composed of 128 points (see Non-patent Document 1).

DISCLOSURE OF THE INVENTION

Problem to be Solved by the Invention

The general remote communication system with a transmitter and a receiver combined transmits the signal for attaining synchronization as a pre-amble (or middle-amble) in combination with a transmitted data body.

In case of the OFDM_UWB communication system as mentioned above, the time sequence is used as the pre-amble signal for attaining synchronization (see Non-patent Document 1). Further, the pre-amble signal is configured with the pattern of the binary ±1, in order to reduce the computational complexity of the correlation processing on the receiving side (because this case saves the multiplication for calculating the correlation only through inverting the symbols).

FIG. 5 illustrates an example of the pre-amble signal of the binary ±1. In this case, the BPSK (Binary Phase Shift Keying) modulation is performed to a known pattern made up with originally the time sequence to generate the pre-amble signal, apart from the data body formed of the OFDM modulated signal for obtaining the time base signal by performing the inverse FFT to the signal on the frequency axis. FIG. 6 typically illustrates a data frame configured with the pre-amble (or synchronization-obtaining) signal having the BPSK modulation applied and the data body having the OFDM modulation applied.

FIG. 7 illustrates the frequency spectrum of a binary time sequence signal (pre-amble pattern) as shown in FIG. 5. As seen in the drawing, the binary time sequence signal forms a spectrum characteristic with sharp irregularities, which is not preferable for securing the stipulation for the transmission power density. Especially, the FCC (federal communications commission) rule concerning the UWB stipulates that the power density measured at each MHz must not exceed −41.3 dBm/MHz, instead of the power of the total signals. Accordingly, in case of the UWB system, the spectrum peaks are necessarily to be measured at a narrower interval than the sampling interval (for example, 4.125 MHz). In the example as shown in FIG. 7, the power spectrum at the peaks of the irregularities exceeds 0 dB (−41.3 dBm); therefore, to transmit the pre-amble as it is will face the situation that the power density cannot conform to the stipulation in the FCC rule. It is naturally necessary to conform to the FCC rule over the total data frame as shown in FIG. 5, not only with the OFDM modulated data body. In FIG. 7, since the peaks (near ±32 on the horizontal axis) exceed the limit by about 5 dB, it is necessary to lower the transmission power of the pre-amble by 5 dB on transmission. This will lead to deterioration of the S/N ratio.

FIG. 8 illustrates an auto-correlation characteristic of the pre-amble signal. It is generally preferred that the output resides only near the center of the time base. In the drawing however, the output resides on the peripheral areas of the time base (for example, near ±16 on the horizontal axis), and it is difficult to give a comment that this auto-correlation characteristic is satisfactory.

In the OFDM modulation system, the general practice nullifies the sub-carriers on the center frequency band and both-end frequency bands of the frequency domain in use (see FIG. 9). In this case, the spectrum of the pre-amble by the BPSK modulation as shown in FIG. 7 and the spectrum of the OFDM signal as shown in FIG. 9 are clearly different in the waveforms; therefore, the receiving side has to switch the filter conditions in the pre-amble part and the OFDM signal part, which is inconvenient and disadvantageous.

[Non-patent Document 1]
IEEE 802.15.3a TI Document<URL:
http://grouper.ieee.org/groups/802/15/pub/2003/May03
file name: 03142r2P802-15_TI-CFP-Document.doc>

An object of the invention is to provide an excellent transmitting device, transmitting method, and storage medium that can preferably perform transmission processing to a known pattern signal such as a pre-amble signal for obtaining synchronization on the receiving side.

Another object of the invention is to provide an excellent transmitting device, transmitting method, and storage medium that can preferably perform transmission processing to a known pattern signal of the time sequence in combination with an OFDM modulated signal.

Another object of the invention is to provide an excellent transmitting device, transmitting method, and storage medium that can preferably perform transmission processing, in a manner that both the time sequence signal of a known pattern and the OFDM modulated signal satisfy the stipulation for the transmission power density without lowering the SN characteristic.

Another object of the invention is to provide an excellent transmitting device, transmitting method, and storage medium that can preferably perform transmission processing to the time sequence signal of a known pattern so as to improve the auto-correlation characteristic for obtaining synchronization and so forth.

Means for Solving the Problem

The invention has been made in view of the above problems, and relates to a transmitting device that processes radio transmitted signals. And it includes: a frequency conversion means that converts an original time sequence signal of a known multi-valued pattern into a frequency signal to attain a spectrum characteristic, a spectrum characteristic processing means that forcibly changes an amplitude of a spectrum signal while retaining the phase information of the spectrum, and a means that reconverts a spectrum having the spectrum characteristic processing applied into a time sequence signal.

The transmitting device relating to the invention transmits the reconverted time sequence signal as a pre-amble signal for obtaining synchronization on the receiving side, together with a data body.

The transmitting device relating to the invention may further include a modulation processing means that modulates a transmitted data body to obtain a modulated signal for transmission. The modulation processing means performs amplitude and phase modulation to the carriers each by the OFDM modulation system as an example, performs inverse FFT to the plural carriers, and thereby converts the original transmitted signal on the frequency axis into a signal on the time base while retaining the orthogonality of the carriers each.

The spectrum characteristic processing means forcibly changes a spectrum amplitude of an original time sequence signal, in a manner that the spectrum amplitude of the original time sequence signal becomes equal to that of a modulated signal for transmission, while retaining the phase information of the spectrum of the original time sequence signal. As an example, the spectrum characteristic processing means forcibly nullifies the spectrum amplitude on the center frequency band and both-end frequency bands of the frequency domain in use, and smoothes the spectrum amplitude on the other regions, in a manner that the spectrum amplitude of the original time sequence signal becomes equal to that of the general OFDM signal while retaining the phase information of the original time sequence signal.

Thus, according to the invention, it is possible to transform the pre-amble signal of the time sequence to be equivalent to the spectrum waveform of the general OFDM signal. Accordingly, it is possible for the receiving side to apply the same filter (low pass filter or band pass filter) to each of the signal frequency bands, which simplifies the construction on the receiving side.

The smoothing is applied to the spectrum except the DC components and the components at the both-end frequency bands of the pre-amble signal. Thereby, in a new spectrum with the waveform shaping applied, the peaks of the irregularities are suppressed. This makes it easy to meet the stipulation for the transmission power density by the FCC and so forth, and makes it possible to attain a higher transmission power for obtaining the same SN characteristic.

The correlation processing on the time base is performed by the convolution operation, which however corresponds to the product of conjugate complex numbers on the frequency axis. Therefore, in the correlation calculation on the center frequency, only the real part remains as the result of the multiplication of the conjugate complex numbers, and it is possible to obtain a greater value by retaining the phase information. Therefore, the above operation of processing the spectrum amplitude while retaining the phase information of the original time sequence signal will lead to eliminating the irregularities on the spectrum of the pre-amble signal, securing the stipulation for the power density, and permitting the maximum transmission power.

EFFECT OF THE INVENTION

According to the invention, it is possible to provide an excellent transmitting device, transmitting method, and storage medium that can preferably perform transmission processing, in a manner that both the time sequence signal of a known pattern as the pre-amble and the OFDM modulated signal satisfy the stipulation for the transmission power density without lowering the SN characteristic.

According to the invention, it is possible to provide an excellent transmitting device, transmitting method, and storage medium that can preferably perform transmission processing to the time sequence signal of a known pattern as the pre-amble so as to better the auto-correlation characteristic for obtaining synchronization and so forth.

According to the invention, it is possible to provide an excellent transmitting device, transmitting method, and storage medium that can preferably perform transmission processing to the time sequence signal of a known pattern by shaping the spectrum waveform arbitrarily, so as not to increase the scale of a device for detecting the correlation on the receiving side.

According to the invention, the spectrum amplitude of the pre-amble pattern on the transmitting side is forcibly adjusted while the phase information thereof is retained, which makes it possible to improve the spectrum and correlation characteristics while securing simplification of a correlation detecting device on the receiving side.

Other objects and features of the invention will become apparent by more detailed descriptions based on the embodiments described later and accompanying drawings.

BEST MODE FOR CARRYING OUT THE INVENTION

The embodiments of the invention will be described in detail with reference to the accompanying drawings.

FIG. 1 typically illustrates a construction of the wireless communication system relating to one embodiment of the present invention. As shown in the drawing, the wireless communication system includes a transmitter that transmits a radio signal and a receiver that receives the radio signal.

The wireless communication system relating to this embodiment adopts the UWB system that performs the wireless communication using the ultra wideband covering 3 GHz to 10 GHz in order to realize a short-distance and ultra highspeed transmission. In view of the problem of the delay distortion and inter-symbol interference under the multi-path environments, it also adopts the OFDM modulation system that transmits to convert plural sub-carriers arranged on the frequency axis into the signal on the time base. The gist of the invention is to transmit the pre-amble signal of the time sequence, in consideration for the stipulation for the transmission power density, the auto-correlation characteristic, and the waveform of the spectrum; and the transmission system of the data body is not specifically restricted.

The transmitter 10 includes a pre-amble generation unit 11 that generates a pre-amble signal composed of a known pattern for attaining synchronization, an OFDM modulation unit 12 that performs the OFDM modulation to transmitted data, an RF unit 13 that up-converts the data frame composed of the pre-amble and the data body into a radio signal, and an antenna 14 that transmits the radio signal to propagation paths. FIG. 10 illustrates an internal construction of the pre-amble generation unit 11. As shown in the drawing, the pre-amble generation unit 11 includes a time-frequency conversion unit 11A, a spectrum characteristic processing unit 11B, and a frequency-time conversion unit 11C.

In this embodiment, the pre-amble signal for attaining synchronization is made up with the time sequence of a multi-valued pattern in order to reduce the computational complexity of the correlation processing on the side of the receiver 20. The method of configuring the pre-amble signal will be described later.

On the other hand, the receiver 20 includes an antenna 21 that receives the radio signal on the propagation paths, an RF unit 22 that down-converts a received signal, a synchronization processing unit 23 that attains synchronization by the correlation processing between the received pre-amble signal and the known pattern retained in advance, and an OFDM demodulation unit 24 that performs the OFDM demodulation to the received data body to restore the original frequency signal.

The wireless communication system relating to this embodiment adopts the OFDM_UWB system, and employs a binary time sequence signal as the pre-amble signal for attaining synchronization, in order to simplify the correlation detecting device on the receiving side (see Non-patent Document 1). However, the spectrum of this pre-amble signal forms irregularities with sharp peaks and dips, which deteriorates the correlation characteristic.

Accordingly, the wireless communication system in this embodiment forcibly adjusts the spectrum amplitude of the pre-amble pattern while retaining the phase thereof on the transmitting side, and thereby improves the spectrum and the correlation characteristic while simplifying the correlation detecting device on the receiving side.

The pre-amble generation unit 11 is provided with an original time sequence signal composed of a known multi-valued pattern as the pre-amble signal. This original pre-amble signal is made up with the binary value of ±1, which is provided by the BPSK modulation, for example, or as the data stored in a ROM (not illustrated). Here, the pre-amble signal is binary (case of BPSK modulation), however it may take a multi-value, for example, +1, 0, −1 more than the binary value.

The time-frequency conversion unit 11A performs the frequency conversion by the Fourier transform to the original pre-amble signal $h_k$ of this time sequence signal to produce a spectrum characteristic $H_k$. And, the spectrum characteristic processing unit 11B converts this $H_k$ into a new spectrum characteristic $G_k$.

As the first procedure for converting the spectrum characteristic $H_k$ into $G_k$, the spectrum characteristic processing unit 11B performs a waveform shaping in a manner that the spectrum waveform of the pre-amble signal part matches with that of the other OFDM signal part. Concretely, the spectrum characteristic processing unit 11B forcibly nullifies the spectrum amplitude, the DC components on the center frequency band and the components on the both-end frequency bands of the frequency domain in use, and smoothes the spectrum amplitude on the other frequency bands in a manner that the spectrum of the pre-amble signal becomes equal to that of the general OFDM signal.

FIG. 2 illustrates a state that the spectrum characteristic processing unit 11B forcibly nullifies the DC components and the components on both the ends of the original spectrum $H_k$, and smoothes the spectrum on the other frequency regions. As the result of shaping the spectrum waveform, the spectrum of the pre-amble signal becomes equal to the spectrum amplitude of the OFDM_UWB part, which facilitates handling. Concretely, by nullifying the DC components (center frequency part) and the components on both the ends of the frequency domain in use, the spectrum of the pre-amble signal becomes equal to the spectrum amplitude of the general OFDM signal, which makes it possible for the receiving side to apply the same filter (low pass filter or band pass filter) to the signal components each, thereby simplifying the configuration of the receiver.

Applying the smoothing to the spectrum except the DC components and the components on both the ends will suppress the peaks of the irregularities in a new spectrum $G_k$. This makes it easy to meet the stipulation for the transmission power density by the FCC and so forth, and makes it possible to attain a higher transmission power for obtaining the same SN characteristic.

The smoothing of the spectrum is achieved by the following formula. That is, by using the following formula, the original time sequence signal of the binary pattern produces a normalized pre-amble signal so as to make the spectrum flat.

$$G_k = \frac{H_k}{|H_k|} \quad \text{[Formula 1]}$$

As the second procedure for converting the spectrum characteristic $H_k$ into $G_k$, the spectrum characteristic processing unit 11B forcibly nullifies the spectrum amplitude while retaining the phase information of the spectrum.

Here, the correlation processing on the time base is performed by the convolution operation, which however corresponds to the product of conjugate complex numbers on the frequency axis. The operations of the correlation processing on the time base and the frequency axis are given by the following formulae.

$$s(\tau) = \int_{-\infty}^{\infty} g(t) h^*(t+\tau) dt \quad \text{[Formula 2]}$$
$$S(f) = G(f) H^*(f)$$

The object of the correlation processing is h*(t+τ) in the above formula. The correlation calculation on the center frequency corresponds to the case of τ=0 on the time base in the above formula. On the frequency axis, only the real part remains as the result of the multiplication of the conjugate complex numbers, and it is possible to obtain a greater value.

Therefore, the above operation of processing the spectrum amplitude while retaining the phase information eliminates the irregularities on the spectrum of the pre-amble signal, secures the stipulation for the power density, and permits the maximum transmission power.

The frequency-time conversion unit 11C performs the inverse FFT to the spectrum $G_k$ thus obtained to restore a time sequence signal $g_k$. The obtained time sequence signal can be used as the pre-amble signal on the transmitting side.

FIG. 3 illustrates an example of the pre-amble signal $g_k$ that is obtained from the original time sequence signal of the binary pattern through the above processing. FIG. 4 illustrates an example of the mutual correlation processing between the transmitted pre-amble signal and the received pre-amble signal. The pre-amble signal $g_k$ is not of the binary pattern. However, as seen in the drawing, the correlation is enhanced remarkably on the center of the time base, and the correlation on the peripheral time domain is suppressed to a low level, which confirms that the correlation characteristic is enhanced.

FIG. 12 through FIG. 16 illustrate concrete examples of the pre-amble signal sequences attained by using the original time sequence signals of the binary pattern through the spectrum smoothing processing relating to the invention. The pre-amble signal sequences in FIG. 12 through FIG. 16 each have different original time sequence signals as the elements. Here, the Sequence Element represents the number of the time sample, and the Value represents the amplitude of each sample. With regard to the Formula 1, the tables in FIG. 12 through FIG. 16 give the results in which the inverse Fourier transform is performed to the signal $G_k$ with the spectrum waveform shaped on the frequency domain.

The transmitter 10 stores the original time sequence signals of the binary value of ±1, for example, as the law data of the pre-amble signal in a ROM, for example. And the following processing may be made: reading an original time sequence signal each time of data transmission; according to the above procedure, performing the Fourier Transform to apply the processing to the spectrum amplitude while retaining the phase information, and thereafter, performing the inverse Fourier Transform to sequentially generate the pre-amble signal.

If the original time sequence signals as the law data of the pre-amble signal are the same, it will always give one and the same pre-amble signal; accordingly, the sequential pattern once calculated on the transmitter 10 may be stored in the ROM as the pre-amble signal for transmission.

FIG. 11 illustrates a construction of the transmitter 10 in this case. The transmitter 10 in FIG. 11 stores the once-calculated sequential pattern in a pre-amble signal storage unit 11' as the pre-amble signal for transmission, which is different form the transmitter 10 as shown in FIG. 1, where the pre-amble generation unit 11 sequentially generates the normalized pre-amble signal to make the spectrum flat.

The pre-amble signal $g_k$ in this case deviates from the binary pattern. However, the transmitter side can store the pre-amble pattern in a ROM or the like as the transmitted data itself, and can use it. Therefore, the deviation from the binary pattern will not cause any problem. And the receiver side may use the binary as it is, in consideration for easily making up the device.

Instead of calculating the pre-amble signal for transmission on the transmitter 10 on the basis of the known original time sequence signal provided in advance, it is also acceptable for a manufacturer of the device to calculate the pre-amble signal from the known original time sequence signal by using the above procedure, and to mount on the transmitter 10 the ROM in which not the original time sequence signal but the actual pre-amble pattern is stored.

The invention has thus been described in detail with reference to specific embodiments. However, it is apparent that a person having ordinary skill in the art is able to make modifications and changes to the aforementioned embodiments without a departure from the gist of the invention. That is, the embodiments have been presented as illustrations for disclosing the invention, and the contents described here in this specification should not be understood in a restricted manner.

BRIEF DESCRIPTION OF THE DRAWINGS

FIG. 4 illustrates an example of the mutual correlation processing between the transmitted pre-amble and the received pre-amble.

FIG. 5 illustrates an example of the pre-amble signal of the value ±1.

FIG. 7 illustrates the frequency spectrum of a time sequence signal as shown in FIG. 5.

FIG. 10 illustrates an internal construction of the pre-amble generation unit 11.

FIG. 12 illustrates a concrete example of the pre-amble signal sequence attained by using the original time sequence signal of the binary pattern through the spectrum smoothing processing relating to the invention.

FIG. 13 illustrates a concrete example of the pre-amble signal sequence attained by using the original time sequence signal of the binary pattern through the spectrum smoothing processing relating to the invention.

FIG. 14 illustrates a concrete example of the pre-amble signal sequence attained by using the original time sequence signal of the binary pattern through the spectrum smoothing processing relating to the invention.

FIG. 15 illustrates a concrete example of the pre-amble signal sequence attained by using the original time sequence signal of the binary pattern through the spectrum smoothing processing relating to the invention.

FIG. 16 illustrates a concrete example of the pre-amble signal sequence attained by using the original time sequence signal of the binary pattern through the spectrum smoothing processing relating to the invention.

EXPLANATION OF REFERENCE NUMERALS

Figure 1:
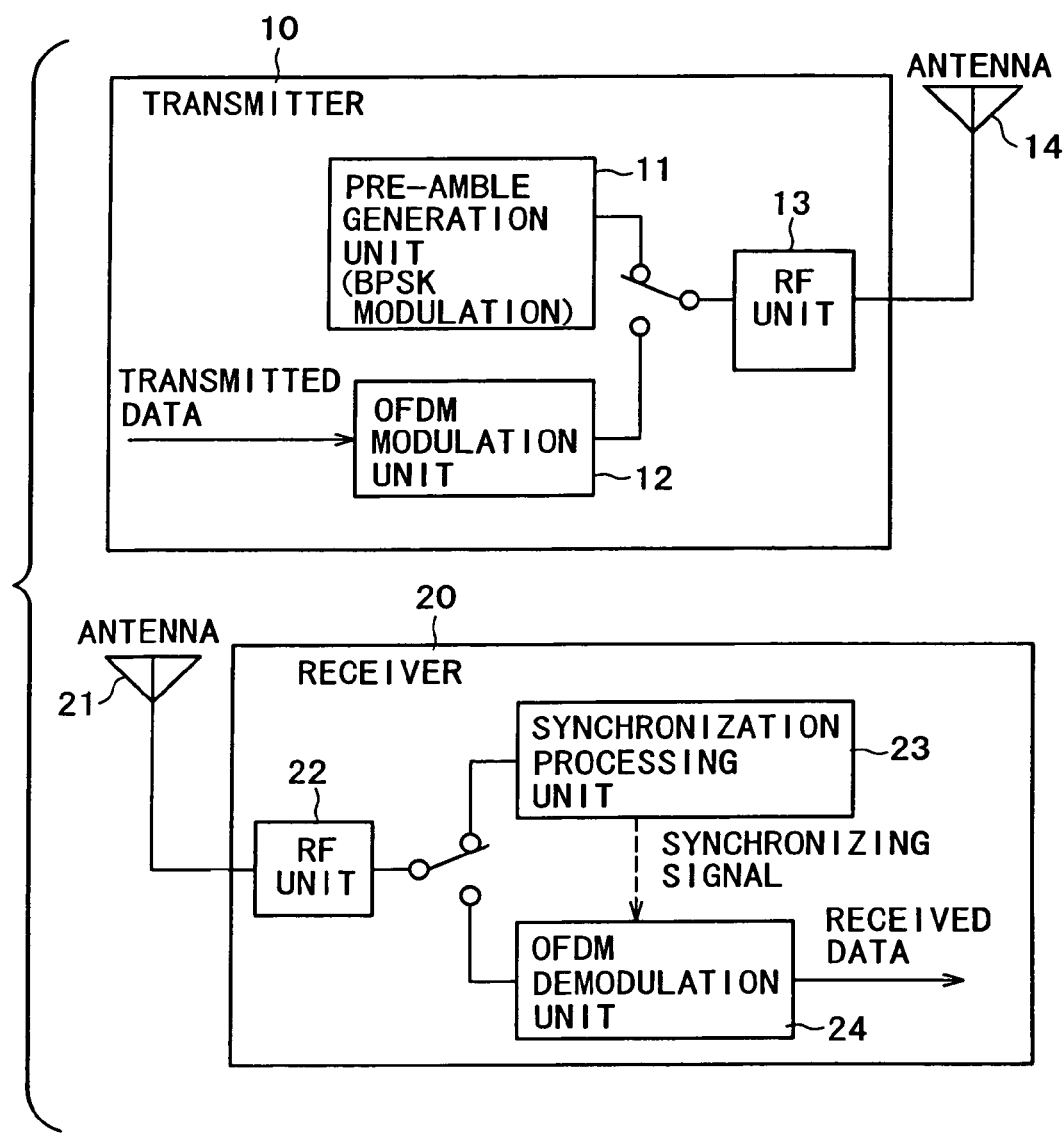
FIG. 1 typically illustrates a construction of the wireless communication system relating to one embodiment of the present invention.
Figure 2:
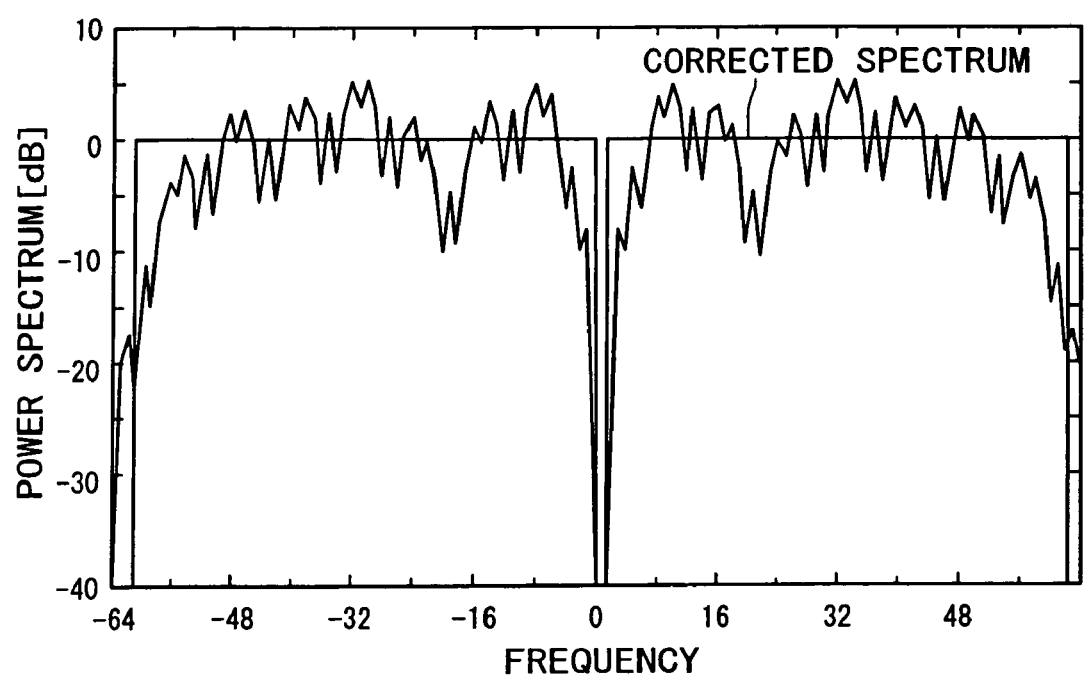
FIG. 2 illustrates a state in which the DC components of the original spectrum $H_k$ and the components on both the ends thereof are forcibly nullified, and the amplitudes of the spectrum on the other regions are smoothed.
Figure 3:
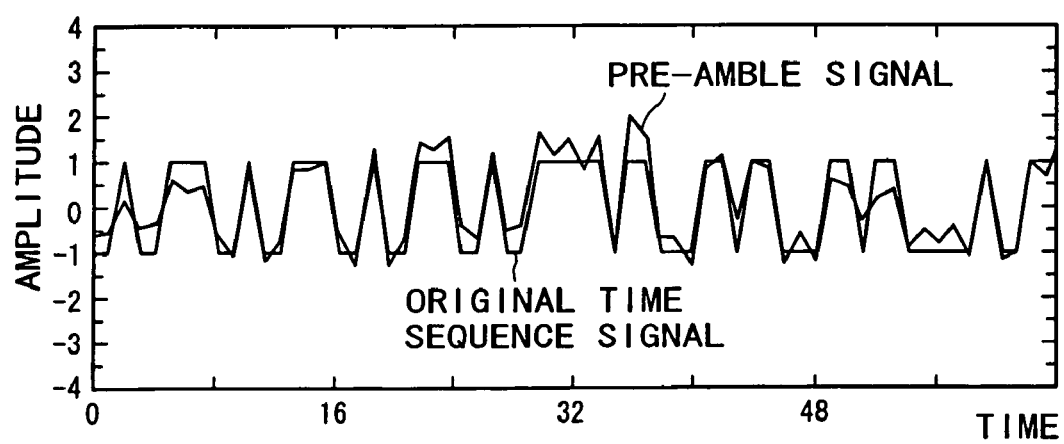
FIG. 3 illustrates an example of the pre-amble signal obtained from the original time sequence signal of the binary pattern.
Figure 6:
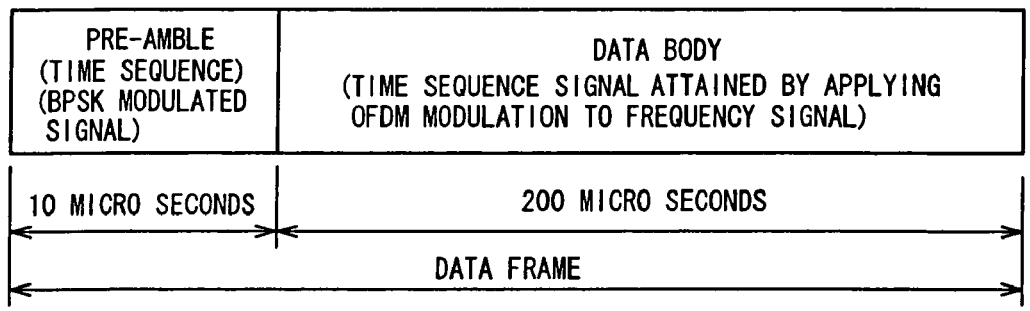
FIG. 6 typically illustrates a data frame configured with the pre-amble (or synchronization-obtaining) signal with the BPSK modulation applied and the data body with the OFDM modulation applied.
Figure 8:
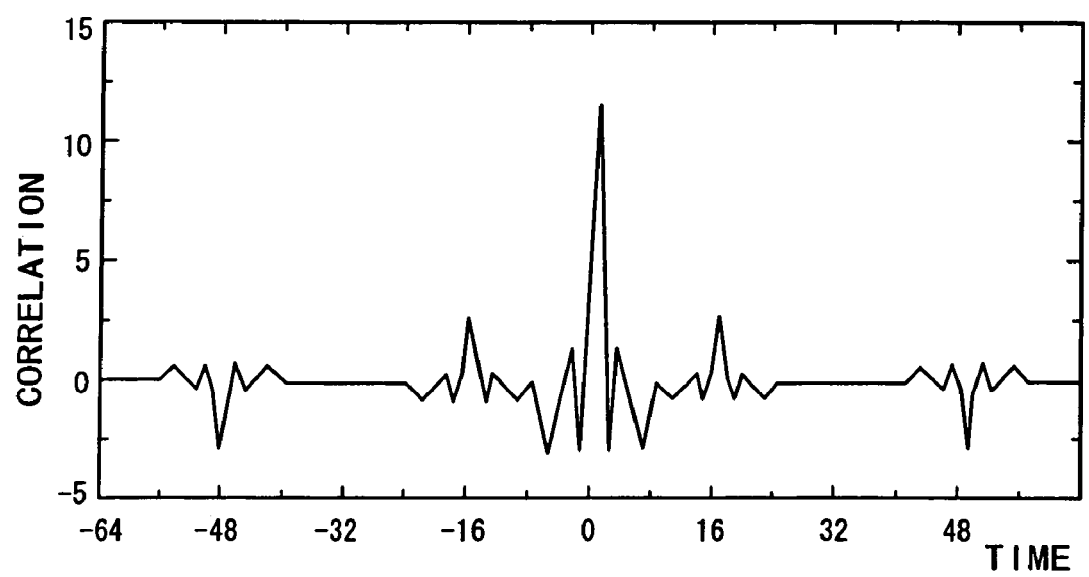
FIG. 8 illustrates an auto-correlation characteristic of the pre-amble signal.
Figure 9:
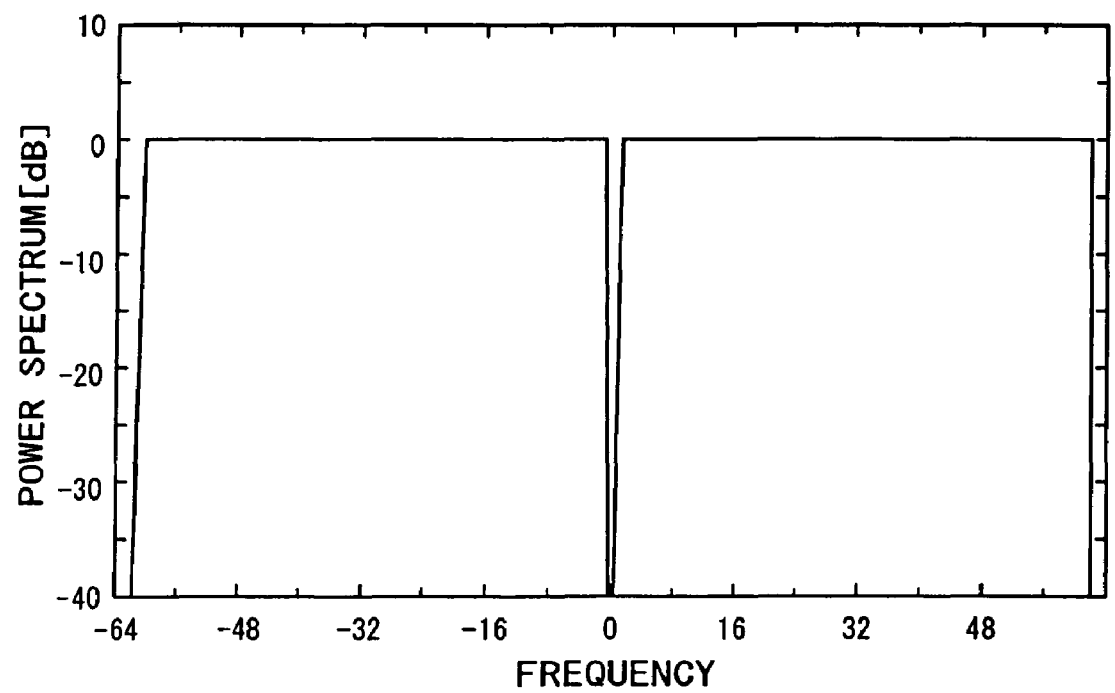
FIG. 9 illustrates a construction of the OFDM signal, in which the sub-carriers on the center and both the ends of the frequency domain in use are nullified.
Figure 11:
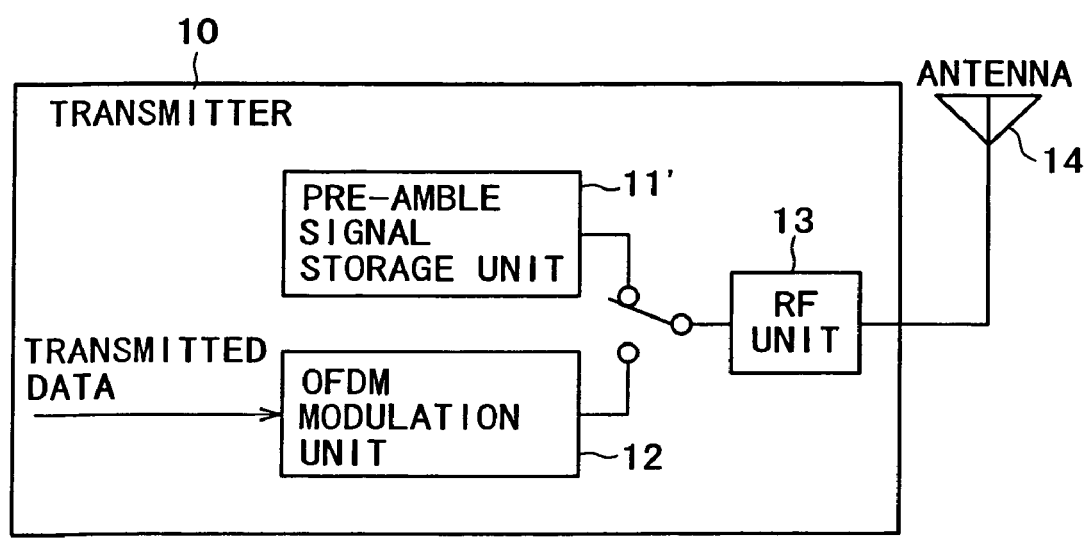
FIG. 11 illustrates another construction of the transmitter 10.

10 . . . transmitter
11 . . . pre-amble generation unit
11' . . . pre-amble signal storage unit
12 . . . OFDM modulation unit
13 . . . RF unit
14 . . . antenna
20 . . . receiver
21 . . . antenna
22 . . . RF unit
23 . . . synchronization processing unit
24 . . . OFDM demodulation unit

The invention claimed is:

1. A transmitting device that processes radio transmitted signals, comprising:
   a frequency conversion means that converts an original time sequence signal of a known multi-valued pattern into a frequency signal to attain a spectrum characteristic;
   a spectrum characteristic processing means that changes an amplitude of the frequency signal while retaining phase information of the frequency signal; and
   a means that reconverts the frequency signal having the spectrum characteristic processing applied into a time sequence signal;
   a means that transmits a signal reconverted into the time sequence signal as a pre-amble signal for attaining synchronization on a receiving side together with a data body;
   and a modulation processing means that modulates the data body to attain a modulated signal for transmission, wherein the modulated signal is transmitted together with the pre-amble signal,
   wherein the spectrum characteristic processing means forcibly changes a spectrum amplitude of an original time sequence signal, in a manner that the spectrum amplitude of the original time sequence signal becomes equal to that of the modulated signal for transmission, while retaining phase information of the spectrum of the original time sequence signal.

2. A transmitting device according to claim 1, wherein the modulation processing means performs an OFDM modulation that applies amplitude and phase modulation to carriers each, applies inverse FFT to the plural carriers, and thereby converts the carriers into signals on the time base, while retaining the orthogonality of the carriers each on the frequency axis.

3. A transmitting device according to claim 2, wherein the spectrum characteristic processing means sets a spectrum amplitude of an original time sequence signal to a specific value at a center frequency band and end frequency bands of a frequency domain in use, and smoothes the spectrum amplitude at the other frequency bands, in a manner that the spectrum amplitude of the original time sequence signal becomes equal to that of a general OFDM signal while retaining phase information of the original time sequence signal.

4. A transmitting device according to claim 3, wherein the spectrum characteristic processing means nullifies the spectrum amplitude on the center frequency band and end frequency bands.

5. A transmitting device according to claim 1, further comprising:
   a pre-amble pattern storage means that stores a signal reconverted into the time sequence signal as the pre-amble signal for attaining synchronization on a receiving side,
   wherein the pre-amble signal read from the pre-amble pattern storage means is transmitted together with a transmitted data body on transmission thereof.

6. A transmitting method that processes radio transmitted signals, comprising:
   converting an original time sequence signal of a known multi-valued pattern into a frequency signal to attain a spectrum characteristic;
   changing an amplitude of the frequency signal while retaining phase information of the spectrum;

reconverting the frequency signal having the spectrum characteristic processing applied into a time sequence signal;

transmitting a signal reconverted into the time sequence signal as a pre-amble signal for attaining synchronization on a receiving side together with a data body; and modulating the data body to attain a modulated signal for transmission, wherein the modulated signal is transmitted together with the pre-amble signal, wherein the changing includes forcibly changing a spectrum amplitude of an original time sequence signal, in a manner that the spectrum amplitude of the original time sequence signal becomes equal to that of the modulated signal for transmission, while retaining phase information of the spectrum of the original time sequence signal.

7. A transmitting method according to claim 6, wherein the modulating includes performing an OFDM modulation that applies amplitude and phase modulation to carriers each, applies inverse FFT to the plural carriers, and converts the carriers into signals on the time base, while retaining the orthogonality of the carriers each on the frequency axis.

8. A transmitting method according to claim 7, wherein the changing includes setting a spectrum amplitude of an original time sequence signal to a specific value at a center frequency band and end frequency bands of a frequency domain in use, and smoothing the spectrum amplitude at the other frequency bands, in a manner that the spectrum amplitude of the original time sequence signal becomes equal to that of a general OFDM signal while retaining phase information of the original time sequence signal.

9. A transmitting method according to claim 8, wherein the changing includes nullifying the spectrum amplitude on the center frequency band and end frequency bands.

10. A transmitting method according to claim 6, further comprising:

storing a signal reconverted into the time sequence signal as the pre-amble signal for attaining synchronization on a receiving side, wherein the pre-amble pattern stored in advance is read out and transmitted together with a transmitted data body.

11. A transmitting device comprising:

a storage medium storing a multi-valued pattern generated by converting an original time sequence signal of a known multi-valued pattern into a frequency signal, changing an amplitude of the frequency signal while retaining phase information of the spectrum, and thereafter reconverting the amplitude-changed frequency signal into the multi-values pattern on the time base;

a modulator configured to modulate a transmitted data body;

a transmitter configured to transmit the multi-valued pattern read from the storage medium as a pre-amble signal for attaining synchronization on a receiving side together with a transmitted signal modulated by the modulator;

wherein a spectrum amplitude of an original time sequence signal is forcibly changed in a manner that the spectrum amplitude of the original time sequence signal becomes equal to that of the modulated signal for transmission, while retaining phase information of the spectrum of the original time sequence signal.

* * * * *